# 3,740,359
VINYLIDENE CHLORIDE EXPANDABLE MICROSPHERES
Joseph L. Garner, Sanford, Mich., assignor to The Dow Chemical Company, Midland, Mich.
No Drawing. Filed July 10, 1972, Ser. No. 270,295
Int. Cl. C08j 1/14, 1/26; B01j 13/02
U.S. Cl. 260—2.5 B          6 Claims

ABSTRACT OF THE DISCLOSURE

A substantially improved expandable vinylidene chloride microsphere is obtained employing a peroxydicarbonate as catalyst. A significant improvement in conversion and reduction in residual vinylidene chloride monomer is obtained.

---

Expandable microspheres are well known and are set forth at great length in U.S. Pat. 3,615,972, herewith incorporated by reference. A particular variety of such microspheres are those which use vinylidene chloride as the principal monomer in their preparation. Such vinylidene chloride polymer microspheres both in expanded and unexpanded form retain the volatile liquid occlusion to a relatively high degree and exhibit resistance to many solvents such as polyester resins, hardenable polyester resin mixtures and the like. Many expandable vinylidene chloride microspheres can be readily expanded below the boiling point of water and are particularly advantageous for incorporation in paper as a bulking agent, as they can be readily expanded during drying of the paper. Heretofore a practical method for the production of microspheres with low residual monomer has not been available. Useable microspheres have been obtained containing from about 10 to 25 weight percent unreacted vinylidene chloride. Such unreacted monomer in many instances represents a substantial hazard as well as loss of raw material.

It would be desirable if there were available an improved method for the preparation of vinylidene chloride polymer microspheres having a relatively low amount of unreacted vinylidene chloride therein.

It would also be desirable if there were available an improved method for the preparation of such microspheres which would permit polymerization thereof at a practical reaction time.

It would further be desirable if there were available a process for the preparation of improved expandable vinylidene chloride polymer microshperes.

These benefits and other advantages in accordance with the present invention are achieved in the preparation of expandable synthetic resinous thermoplastic microspheres having polymerized therein from about 60 to 90 parts by weight of vinylidene chloride and from about 40 to 10 parts by weight of one or more monomers copolymerizable therewith, the steps of the method comprising preparing an oil phase containing the polymerizable components and a liquid blowing agent which volatilizes at a temperature below the heat softening point of the polymer prepared from the monomer mixture, dispersing the oil phase in a water phase, the water phase containing a dispersion stabilizer, the oil phase being dispersed as a plurality of droplets having diameters from about one to about 50 microns, initiating polymerization of the monomer in the droplets to form a plurality of hollow polymer particles having symmetrically encapsulated therein the volatile fluid foaming agent, the improvement which comprises employing a peroxydicarbonate as polymerization initiator.

Suitable peroxydicarbonate compounds which are used to initiate polymerization are of the formula

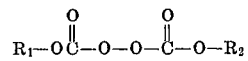

wherein $R_1$ and $R_2$ are independently selected from alkyl radicals containing from 2 to 8 carbon atoms; cycloalkyl radicals containing from 4 to 12 carbon atoms; ar-alkyl radicals containing a single aromatic ring and up to 12 carbon atoms. Generally, such peroxydicarbonate compounds are employed in catalytic quantities of from about 0.05 to about 3 weight percent, based on the weight of the polymerizable materials in the reaction mixture, and beneficially from about 0.2 to about 1 weight percent. The peroxydicarbonates are used alone or as mixtures of two or more. Typical useful compounds are diethyl peroxydicarbonate; di(2-ethylhexyl) peroxydicarbonate; di-2-octyl peroxydicarbonate; dicyclohexyl peroxydicarbonate; dibenzyl peroxydicarbonate and the like.

A wide variety of ethylenically unsaturated materials may be employed with vinylidene chloride. Among the myriad of suitable ethylenic comonomers are styrene, styrenes with alkyl and halogen substituents on the ring and side chain such as o-, m- and p-methyl styrenes, α-methyl styrene, 2,4-dimethyl styrene, 2,3-dimethyl styrene, 2,5-dimethyl styrene, α-chlorostyrene, α-ethyl styrene, p-ethyl styrene, m-propyl styrene, bromostyrene, dichlorostyrene, isopropenyl toluene, vinyl naphthalene, and the o-, m- and p-chlorostyrenes and bromostyrenes; esters of α-methylene aliphatic monocarboxylic acids, such as methyl acrylate, ethyl acrylate, n-butyl acrylate, isobutyl acrylate, dodecyl acrylate, 2-chloroethyl acrylate, 2-chloropropyl acrylate, 2,2′-dichlorisopropyl acrylate, phenyl acrylate, cyclohexyl acrylate, methyl-α-chloroacrylate, methyl methacrylate, ethyl methacrylate, methyl ethacrylate; acrylonitrile, methacrylonitrile; vinyl esters such as vinyl acetate, vinyl chloroacetate, vinyl propionate, vinyl butyrate, vinyl laurate, vinyl stearate; vinyl ethers such as vinyl methyl ether, vinyl isobutyl ether, vinyl 2-chloroethyl ether; vinyl ketones, such as vinyl methyl ketone, vinyl hexyl ketone, methyl isopropenyl ketone; isobutylene; vinylidene halides such as vinylidene chloride, vinylidene chlorofluoride; N-vinyl compounds such as N-vinyl pyrrole, N-vinyl carbazole, N-vinyl indole, N-vinyl succinimide; acrolein, methacrolein, acrylamide, methacrylamide, N-methylol acrylamide; and allyl compounds such as diallyl phthalate, tetrachlorodiallyl phthalate, allyl alcohol, methallyl alcohol, allyl acetate, allyl methacrylate, diallyl carbonate, allyl lactate, allyl α-hydroxyisobutyrate, allyl trichlorosilane, allyl acrylate, diallyl malonate, diallyl oxalate, diallyl gluconate, diallyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl citrate, triallyl cyanurate, triallyl phosphate, trimethylallyl phosphate, tetraallyl silane, tetraallyl silicate, hexallyl disiloxane and the like. The rate of polymerization is time/temperature dependent and can be carried out at temperatures from about 20° C. to about 90° C. However, it is generally preferred to maintain the temperature of the polymerization between about 35° C. and 70° C. As the vinylidene chloride is thermally unstable and has a relatively high exothermic heat of polymerization, usually most desirable temperatures are between about 40° C. and 60° C. Usually it is desirable to employ between about 1 to 4 parts by weight of water per part by weight oil phase in the polymerization.

By way of further illustration, a plurality of polymerization reactions are carried out, each employing as an oil phase 75 parts by weight vinylidene chloride; 25 parts by weight acrylonitrile; 0.3 part by weight divinylbenzene; 11.1 parts by weight isobutane and 0.4 part by weight of a catalyst as indicated in the table which follows. A water phase is prepared employing 112 parts by weight deionized water; 10 parts by weight of a colloidal silica dispersion in water containing 30 weight percent colloidal silica and commercially available under the trade designation of Ludox HS; 0.5 part by weight of a 60 weight percent solution of a copolymer prepared from diethanolamine and adipic acid in equimolar proportions and carrying out the condensation reaction to give a product having a viscosity of 100 centipoises at 25° C.; 0.1 part by weight of potassium dichromate and sufficient aqueous hydrochloric acid to bring the pH of the water phase to 4. The water and oil phases are then admixed by violent agitation supplied by a blade rotating at a speed of about 10,000 revolutions per minute. The resultant reaction mixture is then added to nitrogen-purged reaction vessels which are tumble agitated for 20 hours at the temperature indicated in the table. The reactors are then cooled to room temperature, filtered and the filter cake air-dried and analyzed for residual monomer by extraction in tetrahydrofuran and vapor phase chromatography. The results of the analysis are set forth in the table. Runs 6, 7 and 8 do not constitute a part of the present invention but are included for comparative purposes only. The polymerization temperatures are varied to employ the various catalysts at approximately equal half lives.

tilizes at a temperature below the heat softening point of the polymer prepared from the monomer mixture, dispersing the oil phase in a water phase, the water phase containing a dispersion stabilizer, the oil phase being dispersed as a plurality of droplets having diameters from about one to about 50 microns, initiating polymerization of the monomer in the droplets to form a plurality of hollow polymer particles having symmetrically encapsulated therein the volatile fluid foaming agent, the improvement which comprises employing a peroxydicarbonate as polymerization initiator.

2. The method of claim 1 wherein the peroxydicarbonate has the formula

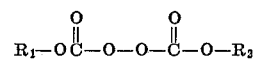

wherein $R_1$ and $R_2$ are independently selected from alkyl radicals containing from 2 to 8 carbon atoms, cycloalkyl radicals containing from 4 to 12 carbon atoms; ar-alkyl radicals containing a single aromatic ring and up to 12 carbon atoms.

3. The method of claim 1 wherein the peroxydicarbonate is seelcted from a group consisting of diethyl peroxydicarbonate; di(2-ethylhexyl) peroxydicarbonate; di-2-octyl peroxydicarbonate; dicyclohexyl peroxydicarbonate;

TABLE

| Run No. | Initiator | Amount percent based on monomer | Temperature, °C.[1] | Polymerization temperature, °C. | Percent residual monomer | Percent conversion |
|---|---|---|---|---|---|---|
| 1 | Isopropyl peroxydicarbonate | 0.5 | 40 | 50 | 2.1 | 93 |
| 2 | do | [2] 0.63 | 40 | 45 | 2.0 | 95 |
| 3 | Secondary butyl peroxydicarbonate | 0.62 | 45 | 45 | 2.0 | 92 |
| 4 | do | [2] 0.88 | 45 | 45 | 1.0 | 94 |
| 5 | Normal propyl peroxydicarbonate | [2] 0.62 | 40 | 45 | 1.7 | 92 |
| 6 | α,α-Azobisisobutyronitrile | [2] 0.5 | 60 | 60 | 19 | 70 |
| 7 | α,α'-Azobis-α,γ-dimethylvaleronitrile | [2] 0.76 | 52 | 50 | 5.2 | 88 |
| 8 | Lauryl peroxide | [2] 1.21 | 62 | 60 | | 81 |

[1] To give a half life of 10 hours.
[2] Equimolar percent.

In a manner similar to the foregoing illustration, other vinylidene chloride microspheres are readily prepared having low residual monomers employing the hereinbefore mentioned peroxydicarbonates.

As is apparent from the foregoing specification, the present invention is susceptible of being embodied with various alterations and modifications which may differ particularly from those that have been described in the preceding specification and description. For this reason it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In the preparation of expandable synthetic resinous thermoplastic microspheres having polymerized therein from about 60 to 90 parts by weight of vinylidene chloride and from about 40 to 10 parts by weight of one or more monomers copolymerizable therewith, the steps of the method comprising preparing an oil phase containing the polymerizable components and a liquid blowing agent which voladibenzyl peroxydicarbonate; isopropyl peroxydicarbonate; sec-butyl peroxydicarbonate; n-propyl peroxydicarbonate.

4. The method of claim 1 wherein polymerization is conducted at temperatures from about 20° C. to about 90° C.

5. The method of claim 1 wherein the peroxydicarbonate is present in a quantity of from about 0.05 to about 3 weight percent, based on the weight of the polymerizable material.

6. The method of claim 1 wherein the copolymerizable monomer is acrylonitrile.

References Cited
UNITED STATES PATENTS 3,696,079  10/1972  Possberg et al. _____ 260—87.7
3,615,972  10/1971  Morehouse _____ 260—2.5 B JOHN C. BLEUTGE, Primary Examiner M. FOELAK, Assistant Examiner U.S. Cl. X.R.

260—80.3 R, 85.5 F, 87.7